United States Patent
Collom (10) Patent No.: US 10,736,282 B1
(45) Date of Patent: Aug. 11, 2020

(54) PLANT HYDRATING COASTER

(71) Applicant: Freddy C. Collom, Mission, TX (US)

(72) Inventor: Freddy C. Collom, Mission, TX (US)

( * ) Notice: Subject to any disclaimer, the term of this patent is extended or adjusted under 35 U.S.C. 154(b) by 0 days.

(21) Appl. No.: 16/773,121

(22) Filed: Jan. 27, 2020

(51) Int. Cl.
| | |
|---|---|
| *A47G 23/02* | (2006.01) |
| *A47G 23/03* | (2006.01) |
| *A01G 27/02* | (2006.01) |
| *A01G 27/04* | (2006.01) |

(52) U.S. Cl.
CPC .......... *A01G 27/02* (2013.01); *A01G 27/04* (2013.01); *A47G 23/0216* (2013.01); *A47G 23/0306* (2013.01)

(58) Field of Classification Search
CPC ........ A01G 27/04; A01G 27/02; A01G 27/00; A47G 23/03; A47G 23/0306; A47G 23/0216

See application file for complete search history.

(56) References Cited

U.S. PATENT DOCUMENTS

| | | | | |
|---|---|---|---|---|
| 1,662,146 | A * | 3/1928 | Elliott | A47G 19/06 248/37.3 |
| 2,482,704 | A * | 9/1949 | Colfiesh | A47G 23/0216 248/128 |
| 3,491,976 | A * | 1/1970 | Larson | A47B 13/16 248/346.11 |
| 5,590,861 | A * | 1/1997 | Ardolino | A47G 23/0216 248/146 |
| D408,227 | S | 4/1999 | Swann, Jr. | |
| D676,716 | S * | 2/2013 | Lalo | D7/619.1 |
| 8,534,491 | B1 | 9/2013 | Stocker | |
| D691,860 | S * | 10/2013 | Berio, Jr. | D7/619.1 |
| D817,123 | S * | 5/2018 | Johnsen | D8/7 |
| 2011/0232184 | A1* | 9/2011 | Fagan | A47G 7/041 47/66.6 |
| 2014/0332644 | A1 | 11/2014 | Davis | |
| 2018/0177138 | A1* | 6/2018 | Adams | A01G 27/005 |
| 2018/0295798 | A1* | 10/2018 | Jordan | A01G 27/02 |
| 2019/0200541 | A1* | 7/2019 | Park | A01G 9/02 |

OTHER PUBLICATIONS

12 Extraordinary Tree Coat Racks to Break the Monotony in the Home. Product Listing [online]. Pinterest.com [retrieved on Jul. 10, 2019]. Retrieved from the Internet: <URL: https://www.pinterest.com/pin/295759900508846037/>.

What Is a Living Coaster?. Product Listing [online]. © Copyright 2018. [retrieved on Jul. 10, 2019]. Retrieved from the Internet: <URL: http://www.livingcoaster.com/>.

* cited by examiner

*Primary Examiner* — Magdalena Topolski
*Assistant Examiner* — Kevin M Dennis
(74) *Attorney, Agent, or Firm* — Cramer Patent & Design, PLLC; Aaron R. Cramer (57) ABSTRACT

A plant hydrating coaster includes a stand having an upright support and an upper tray. The base of the tray has a plurality of apertures which permit condensation from a beverage secured within the tray to drip upon a plant situated beneath.

19 Claims, 7 Drawing Sheets

PLANT HYDRATING COASTER

RELATED APPLICATIONS

None.

FIELD OF THE INVENTION

The present invention relates to a coaster and more specifically to a plant hydrating coaster.

BACKGROUND OF THE INVENTION

Every day across the globe, countless numbers of people will enjoy a hot or cold beverage and oftentimes in so doing—a certain amount of condensation will form upon the exterior surface of the beverage cup. In such circumstances, a significant number of the aforementioned people will employ the use of a coaster to keep the condensation from wetting the surface beneath the beverage cup. While the traditional coaster may prevent water damage to the surface upon which it is placed—the water is nevertheless wasted.

One common use of water is to keep a house plant hydrated. Were there a way for an environmentally conscientious individual to utilize condensation from a beverage cup to water a house plant—most if not all would readily employ such a method. The plant hydrating coaster provides such a solution by permitting a user to channel condensation into a potted plant below the coaster in a way that is efficient and cost effective manner.

BRIEF SUMMARY OF THE INVENTION

The principles of the present invention provide for a beverage container stand coaster comprises a coaster supported on a stand. The coaster and the stand are formed together. The coaster is an open cylindrical body with an interior, a cylindrical first sidewall, a planar bottom wall, and a gate assembly slidably retained to a bottom wall interior. The beverage container stand coaster also comprises a ledge which is located on the interior side of the first sidewall. The ledge extends inwards continuously about its diameter. The beverage container stand coaster also comprises a stand vertical portion having a first end and a second end and a stand base first side and a stand base second side continuous and horizontally disposed relative to the stand vertical portion. The stand base first side and the stand base second side are configured to rest upon a horizontal surface. The beverage container stand coaster also comprises a first end of the stand vertical portion which bisects the transition point between the stand base first side and the stand base second side and is vertically positioned relative thereto.

The beverage container stand coaster also comprises a post horizontal portion which extends horizontally ninety degrees away from the front directly from the second end of the post vertical portion, a perimeter of a second sidewall depended downwards from the perimeter of a bottom wall exterior at a distance that equals a pair of slots located at diametrically opposing sides of the second sidewall and a gate assembly which is slidably retained within each of the pair of slots. The gate assembly includes a gate first segment which is located on the first side of the pair of slots that has a width enabling it to be slidably engaged with one of the pair of slots.

The beverage container stand coaster also comprises a gate first end which is disposed at a terminal end of the gate first segment. The gate first end includes a pair of laterally extending ears of a gradually curved nature that restrict full retraction of the gate first segment within the pair of slots. The beverage container stand coaster also comprises a gate second segment which is adjacent the gate first segment that is separated by a pair of opposing gates first notches. The gate second segment fully resides subjacent to the bottom wall. The beverage container stand coaster also comprises a gate third segment which resides adjacent the gate second segment that is separated by a pair of opposing gates second notches. The gate third segment fully resides subjacent to the bottom wall.

The beverage container stand coaster also comprises a gate fourth segment which resides adjacent to the gate third segment that is separated by a pair of opposing gates third notches. The gate fourth segment fully resides subjacent to the bottom wall. The beverage container stand coaster also comprises a gate second end adjacent the gate fourth segment and separated by a pair of opposing gates fourth notches. The gate second end fully resides outside the second sidewall on the other side of the slot. The gate second end is similar to the gate first end in that it comprises of a pair of laterally extending ears of a gently curved nature that restrict full retraction of the gate second end within the slot. The beverage container stand coaster also comprises a gate aperture located on the gate third segment. The gate aperture has a diameter sized to be identical with the width of the slot, as well as identical with the diameter of the coaster aperture, when fully aligned, the coaster aperture and the gate aperture enables the interior of the coaster to be in fluid communication with the area below the coaster and in front of and above the stand.

The beverage container stand coaster may support a beverage container above a plant within a pot. The beverage container stand coaster may be made out of a resilient material such as plastic and may have a unitary construction. The coaster and the stand may be separate or have separate features that are permanently conjoined by a bonding method. The bonding method may be adhesive or welding. The stand may be tubular and hollow or tubular and solid.

The coaster may be attached to the end of the post horizontal portion opposite the post vertical portion. The stand may be capable of a balanced support of a beverage container that is full and supported within the coaster. The thickness of the first sidewall may be larger between the ledge and the bottom wall interior than the location between the ledge and the upper wall. The beverage container stand coaster may further comprise a plurality of different diameters at those locations of the inner surface of the first sidewall and enables different diameters of beverage containers to be securely supported within the coaster.

The stand base first side and the stand base second side may each terminate in a rounded shape. The width between the inner sides of the parallel portions of the stand base first side may accommodate a desk-type or small houseplant. The pair of gates first notches and the pair of gates fourth notches may be configured to engage the inner walls of the respective pair of slots to limit movement of the gate assembly within the pair of slots.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 beverage container stand coaster
11 coaster
12 upper wall
13 first sidewall
15 interior
20a bottom wall interior
20b bottom wall exterior
21 second sidewall
25 ledge
27 slot
30a gate first segment
30b gate second segment
30c gate third segment
30d gate fourth segment
35a gate first end
35b gate second end
38a gate first notch
38b gate second notch
38c gate third notch
38d gate fourth notch
40 coaster aperture
45 gate aperture
50 stand
51 post vertical portion
52a stand base first side
52b stand base second side
55 post horizontal portion
60 beverage container
63 dirt
64 plant
65 pot

DESCRIPTION OF THE PREFERRED EMBODIMENTS

The best mode for carrying out the invention is presented in terms of its preferred embodiment, herein depicted within FIGS. 1 through 7. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Figure 1:
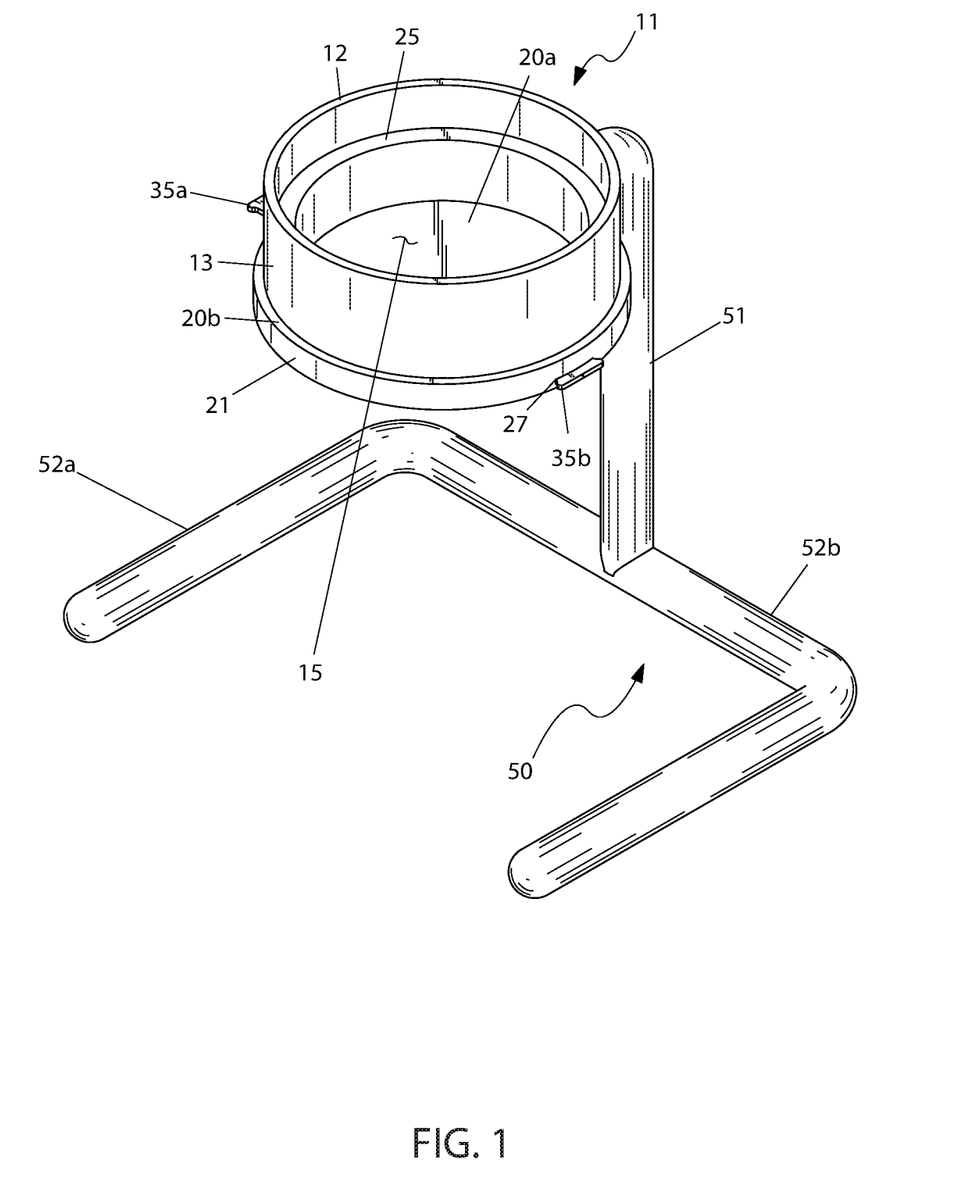
FIG. 1 is a top first side perspective view of a beverage container stand coaster 10, according to the preferred embodiment of the present invention.
Figure 2:
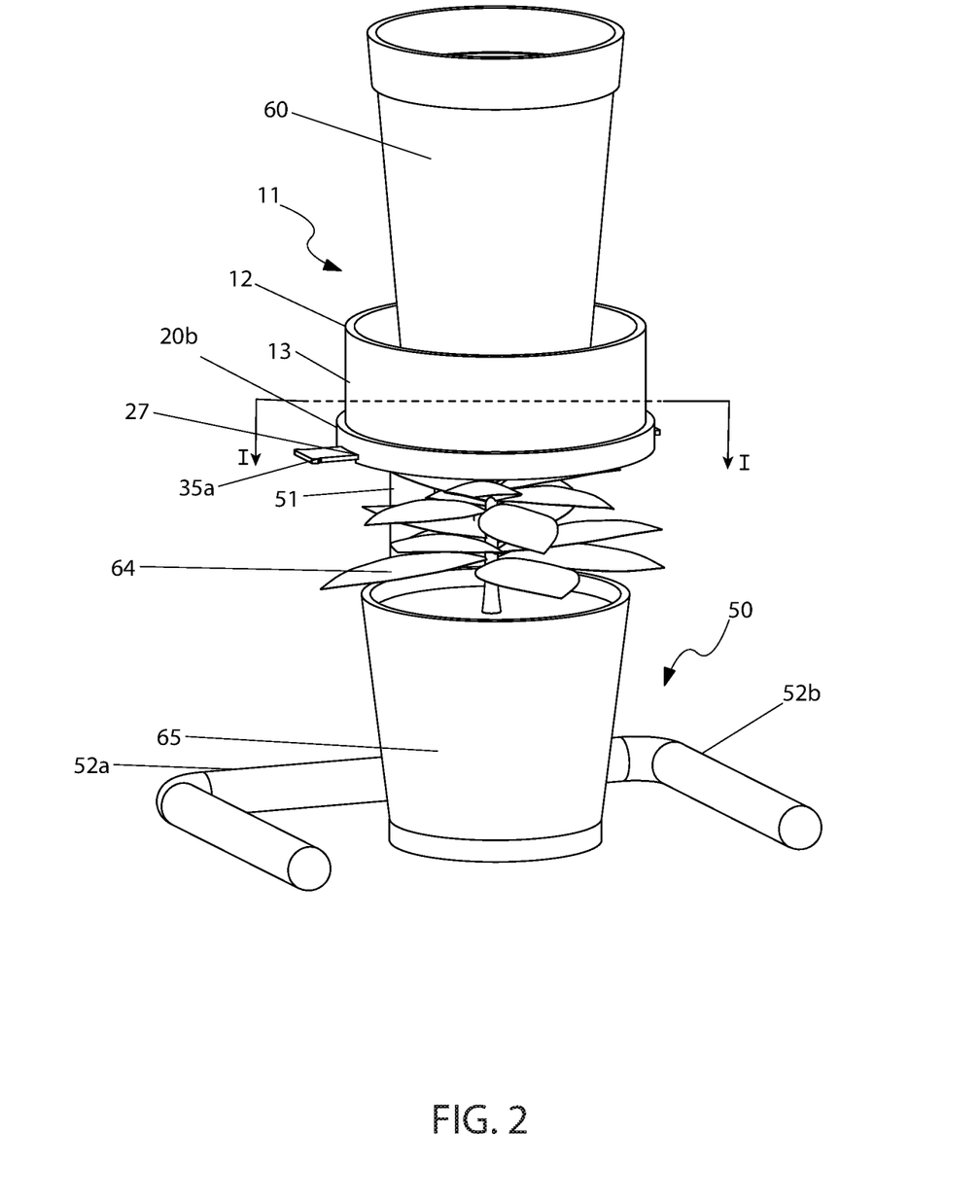
FIG. 2 is a front perspective environmental view of the beverage container stand coaster 10 with a plant 64, according to the preferred embodiment of the present invention.
Figure 3:
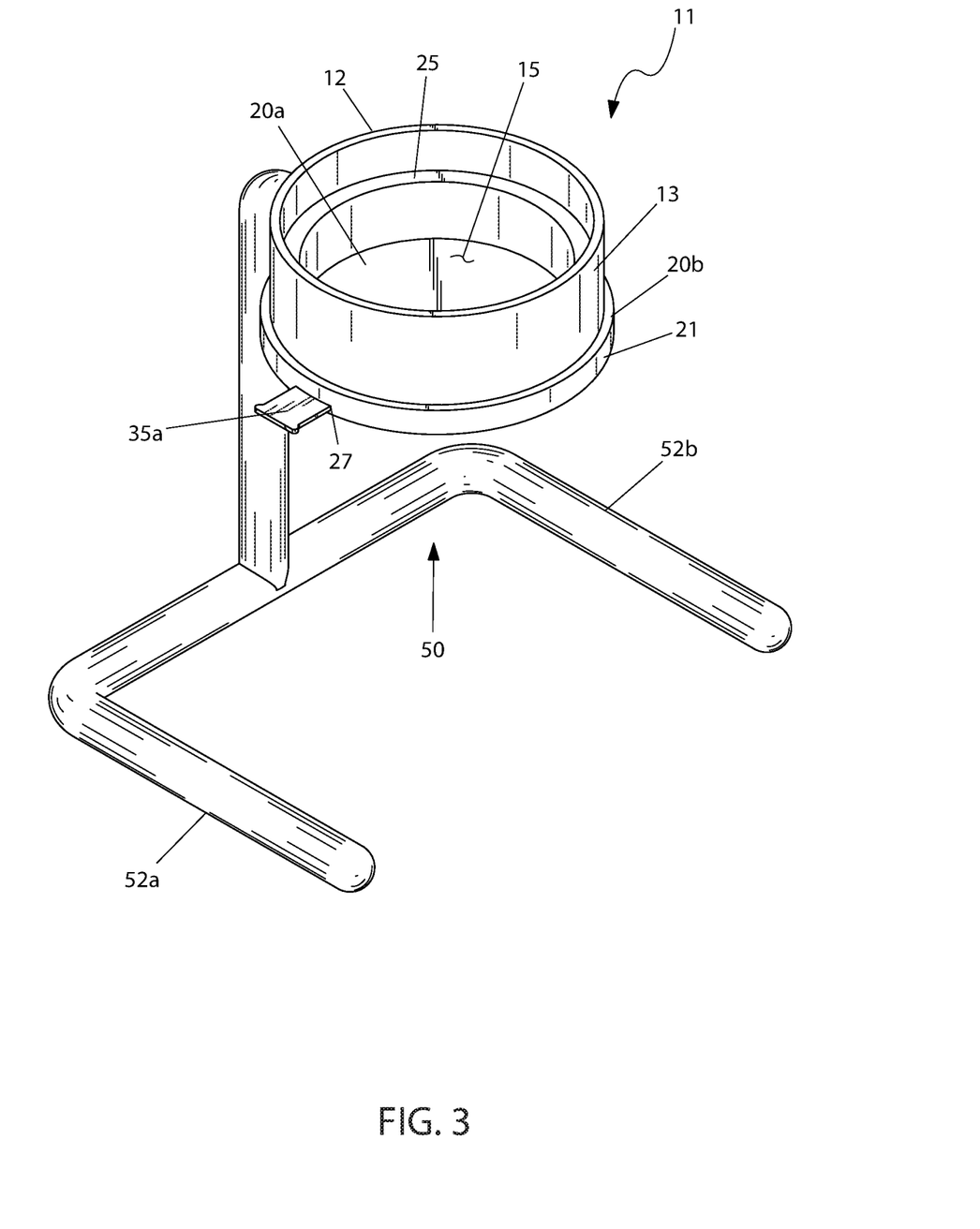
FIG. 3 is a top second side perspective view of the beverage container stand coaster 10, according to the preferred embodiment of the present invention.

Referring now to FIGS. 1 and 2, a top perspective view and a front perspective environmental view of a beverage container stand coaster (herein described as the "device") 10, it is shown that the device 10 is capable of supporting a beverage container 60 above a small plant 64 within a pot 65. The device 10 includes a coaster 11 that is supported on a stand 50. The coaster 11 and stand 50 can be formed together such that the device 10 is a unitary construction or the coaster 11 and stand 50 can be formed as separate features that are permanently conjoined to create the device 10. It is preferred that the device 10 is manufactured out of a resilient material, such as plastic, and in embodiments where the coaster 11 and stand 50 are separate, they are conjoined by a bonding method such as adhesive or welding. The device 10 is also preferably waterproof and capable of being easily washed.

The stand 50 comprises generally a tubular (hollow or solid) unitary fabrication. A post vertical portion has a first end and a second end. A stand base first side 52a and stand base second side 52b are continuous and are horizontally disposed relative to the stand vertical portion 51. The stand base first side 52a and stand base second side 52b are configured to rest upon a horizontal surface. The stand base first side 52a and the stand base second side 52b each have a bent portion that extends ninety degrees (90°) and towards the front. The width between the inner sides of the parallel portions of the stand base first side 52a and stand base second side 52b is capable of bracketing a pot 65 that holds a plant 64, such as desk-type or small houseplants. The stand base first side 52a and stand base second side 52b each terminate in a rounded shape. The first end of the stand vertical portion 51 bisects the transition point between the stand base first side 52a and the stand base second side 52b and is vertically positioned relative thereto. A post horizontal portion 55 extends horizontally ninety degrees (90°) away from and towards the front directly from the second end of the post vertical portion 51. The coaster 11 is attached to the end of the post horizontal portion 55 opposite the post vertical portion 51. The stand 50 is capable of a balanced support of a beverage container 60 that is full and supported within the coaster 11.

The coaster 11 is centrally positioned above the bisecting axial centerline extending horizontally away from the stand post vertical portion 51 and equidistant between both the stand base first side 52a and stand base second side 52b. The coaster 11 is generally an open cylindrical body with an interior 15, a cylindrical first sidewall 13, a planar bottom wall 20a, 20b, and a gate assembly 30a, 30b, 30c, 30d slidably retained to the bottom wall 201, 20b. The first sidewall 13 has a bottom edge continuously affixed or otherwise attached to and upstanding from the bottom wall 20a, 20b, and has a smaller outer diameter than the bottom wall 20a, 20b. As such, the location of the first sidewall 13 delineates between the bottom wall interior 20a, which is in the interior 15 of the coaster 11, and the bottom wall exterior 20b. It is appreciated that the bottom wall exterior 20b has a width much less than that of the bottom wall interior 20a.

Located along the upper continuous edge of the first sidewall 13 is an upper wall 12. Located on the interior side of the first sidewall 13 is a ledge 25, which extends inwards continuously about its diameter, therefrom. The thickness of the first sidewall 13 is thus larger between the location of the ledge 25 and the bottom wall interior 25a than the location between the ledge 25 and the upper wall 12, and thus provided different diameters at those locations of the inner surface of the first sidewall 20a. This enables different diameters of beverage containers 60 to be securely supported within the coaster 11. It is envisioned that the different diameters of the first sidewall 11 corresponds to commonly available sizes of beverage containers 60 such as fast food restaurant cups, coffee mugs, soft drink or alcoholic beverage cans, etc. The outer surface of the bottom wall exterior 20b is defined as the second sidewall 21. The perimeter of the second sidewall 21 depends downwards from the perimeter of the bottom wall exterior 20b at a distance. Located at diametrically opposing sides of the second sidewall 21 is a pair of slots 27.

Figure 4:
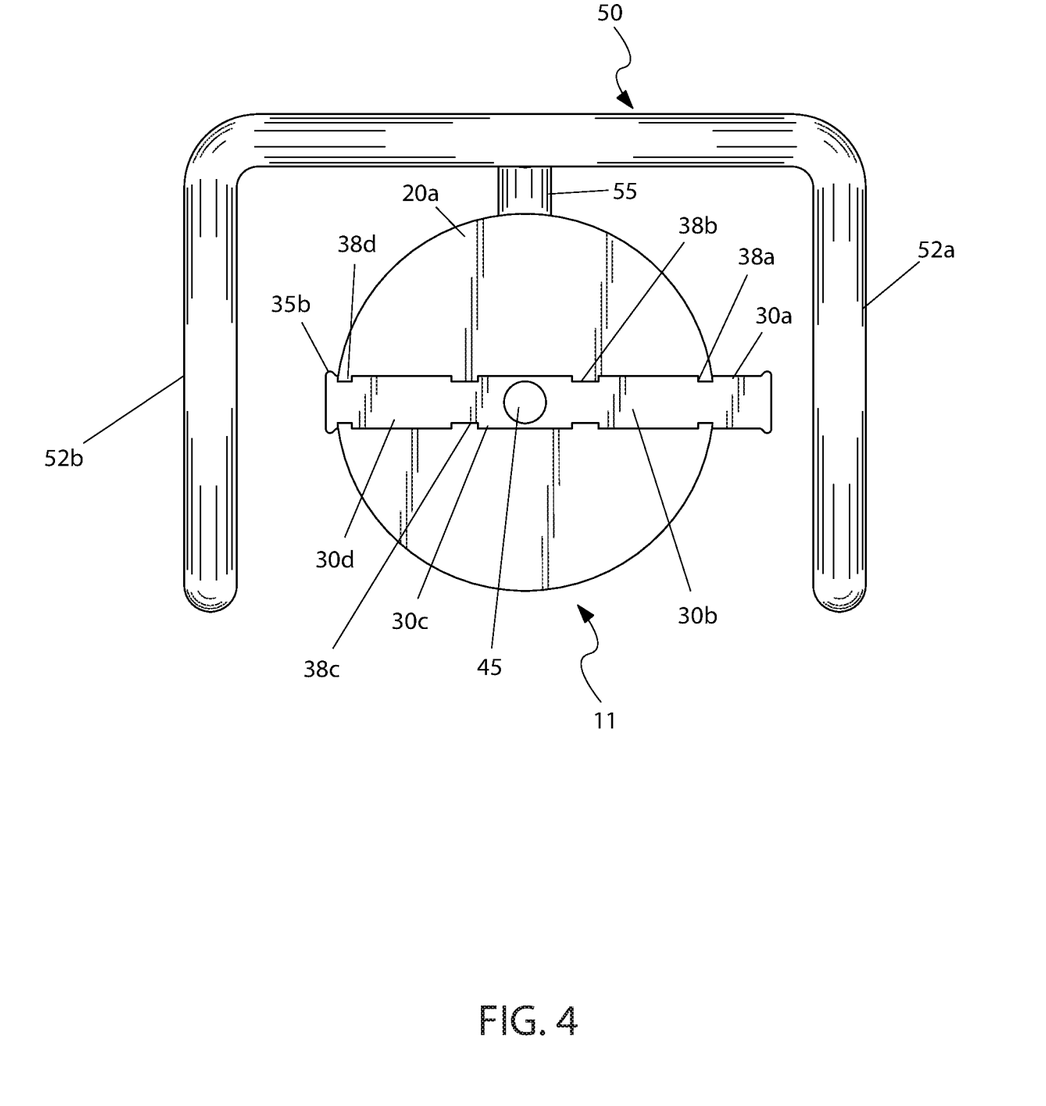
FIG. 4 is a bottom view of the beverage container stand coaster 10, according to the preferred embodiment of the present invention.
Figure 5:
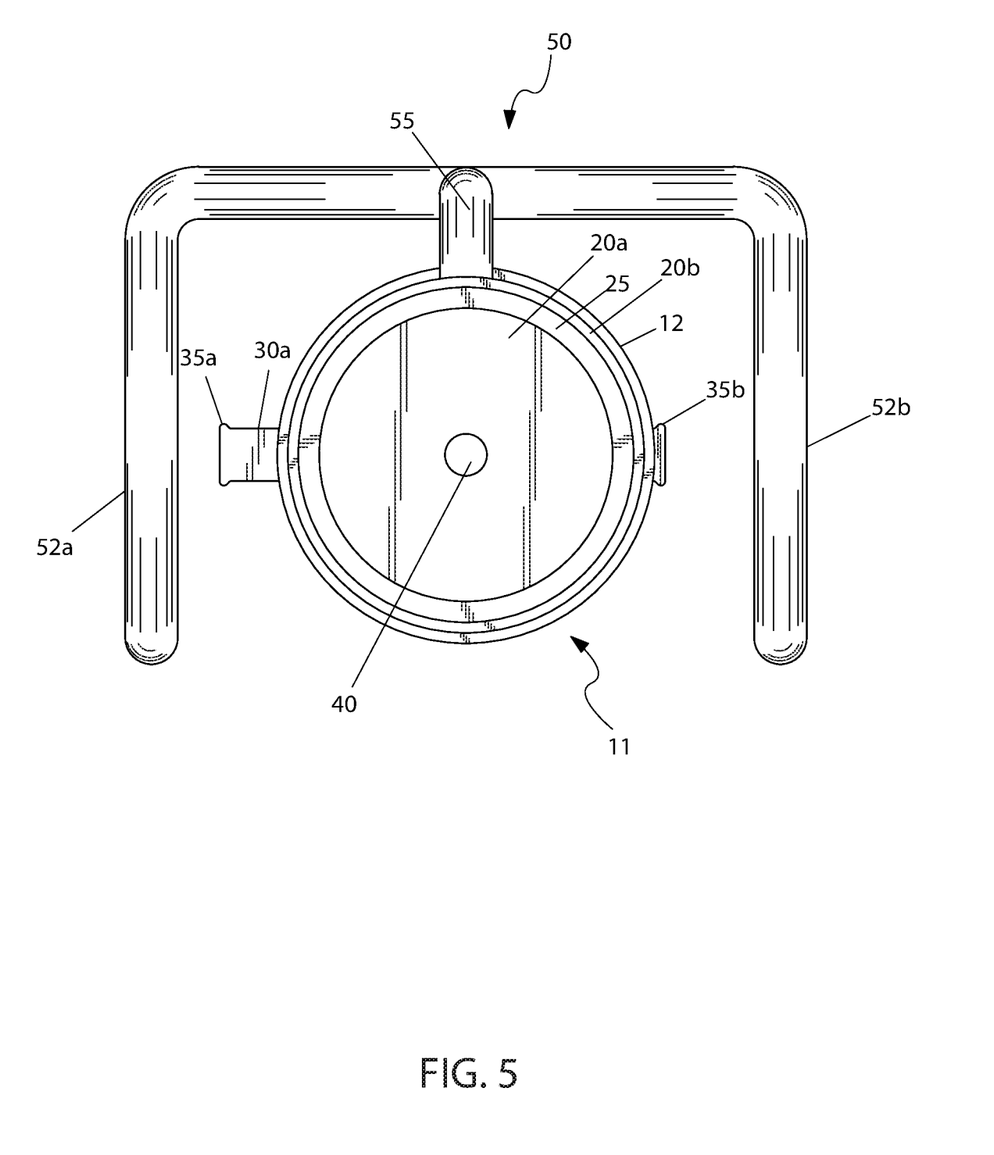
FIG. 5 is a top plan view of the beverage container stand coaster 10, according to the preferred embodiment of the present invention.
Figure 6:
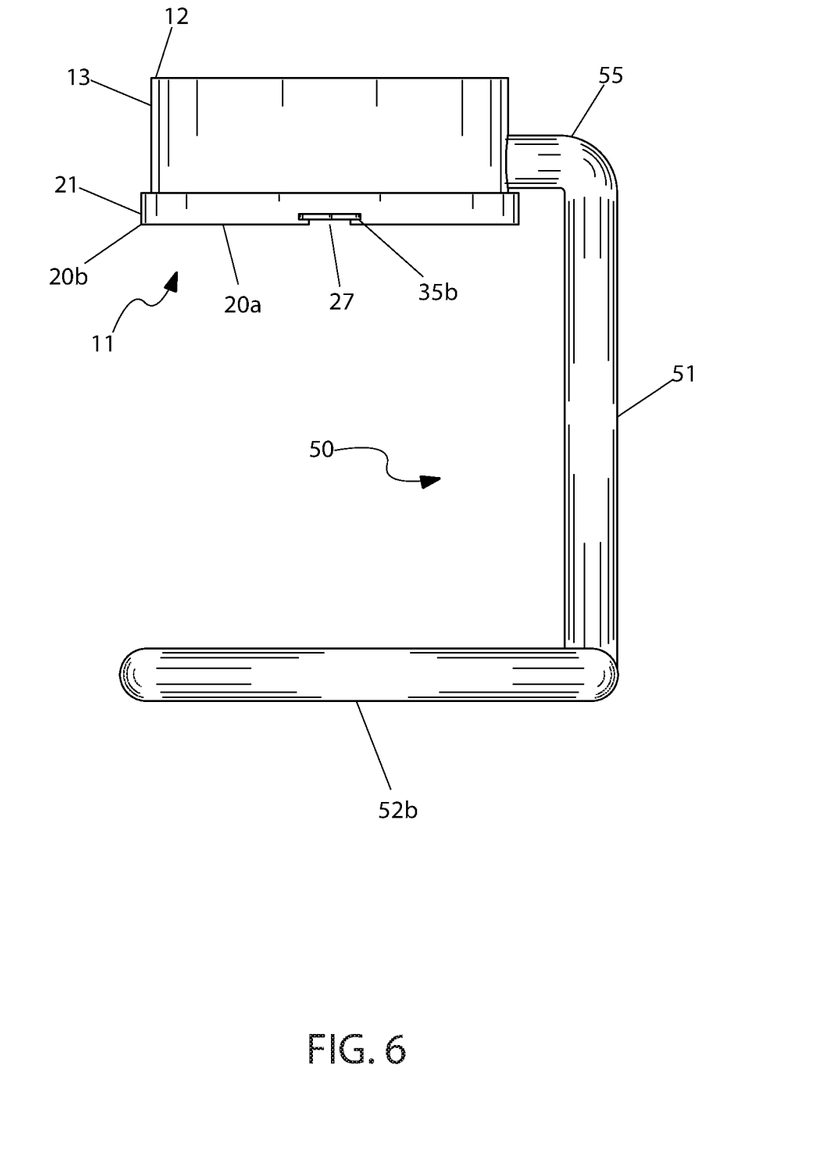
FIG. 6 is a top plan view of the beverage container stand coaster 10, according to the preferred embodiment of the present invention; and, FIG. 7 is a cross-sectional view of the beverage container stand coaster 10 along the line I-I (see FIG. 2), according to the preferred embodiment of the present invention.

Referring more closely now to FIGS. 4 through 6, bottom, top, and side views of the device 10, shows a gate assembly 30a, 30b, 30c, 30d as it is slidably retained within the slot 27. A coaster aperture 40 is located centrally on the bottom wall interior 20a and has a diameter sized to be generally identical with the width of the slot 27.

The gate assembly 30a, 30b, 30c, 30d is composed of four (4) segments. A gate first segment 30a is located on the first side of the slot 27 (generally considered to be on the same side as the stand base first side 52a) and has a width enabling it to be slidably engaged with the slot 27 (i.e., the width is smaller than the width of the slot 27). At the terminal end of the gate first segment 30a is a gate first end 35a, which comprises of a pair of laterally extending ears of a gently curved nature that restrict full retraction of the gate first segment 30a within the slot 27. Adjacent the gate first segment 30a and separated by a pair of opposing gate first notches 38a, is a gate second segment 30d. The gate second segment 30b fully resides subjacent to the bottom wall 20a, 20b. Adjacent the gate second segment 30b and separated by a pair of opposing gate second notches 38b, is a gate third segment 30c. The gate third segment 30c fully resides subjacent to the bottom wall 20a, 20b. Adjacent the gate third segment 30c and separated by a pair of opposing gate third notches 38c, is a gate fourth segment 30d. The gate fourth segment 30d fully resides subjacent to the bottom wall 20a, 20b. Adjacent the gate fourth segment 30d and separated by a pair of opposing gate fourth notches 38d, is a gate second end 35b. The gate second end 35d fully resides outside the second sidewall 21 on the other side of the slot 27. The gate second end 35b is generally similar to the gate first end 35a in that it comprises of a pair of laterally extending ears of a gently curved nature that restrict full retraction of the gate second end 35b within the slot 27.

The pair of gate first notches 35a and pair of gate fourth notches 35d are configured to engage the inner walls of the respective slots 27 to limit movement of the gate assembly 30a, 30b, 30c, 30d within the slots 27. Located on the gate third segment 30c is a gate aperture 45. The gate aperture 45 preferably has a diameter sized to be generally identical with the width of the slot 27, as well as generally identical with the diameter of the coaster aperture 40. When fully aligned, the coaster aperture 40 and gate aperture 45 enables the interior 15 of the coaster 11 to be in fluid communication with the area below the coaster 11 and in front of and above the stand 50.

2. Operation of the Preferred Embodiment

The preferred embodiment of the present invention can be utilized by the common user in a simple and effortless manner with little or no training. It is envisioned that the device 10 would be constructed in general accordance with FIGS. 1 and 3 through 6. The user would procure the device 10 from conventional procurement channels such as hardware stores, home improvement stores, mail order and internet supply houses and the like. Special attention would be paid to the size (i.e. height and width) of the stand 50, the size (i.e. diameter) of the coaster 11.

Figure 7:
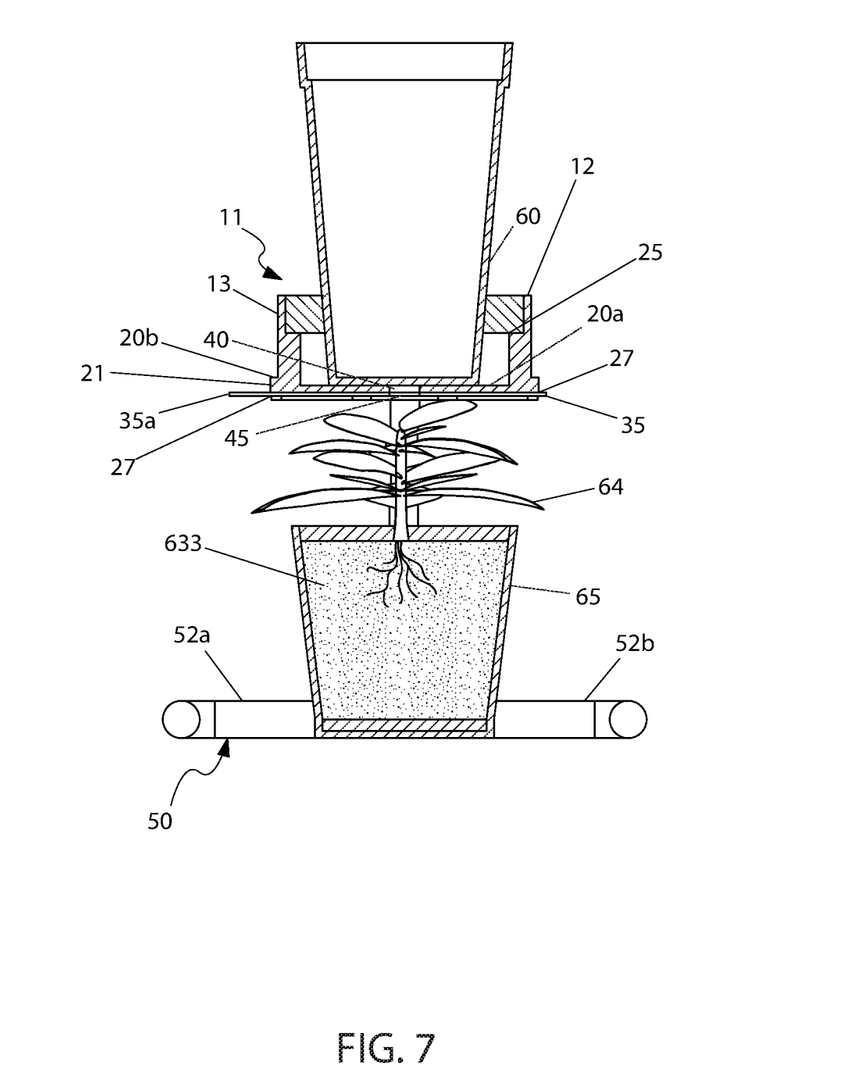

Referring now to FIGS. 1, 2, and 7, which shows environmental views of the device 10. After the proper size of the device 10 is obtained, with special attention to the size and shape of the beverage container 60 as well as the size and shape of the pot 65 and plant 64, the stand 50 is placed on a horizontal support surface, a pot 65 with a plant 64 is placed in between the stand 50 (i.e., in front of the post vertical portion 51 and between the stand base first side 52a and stand base second side 52b, and a beverage container 60 can be placed in the coaster 11. The interior 15 of the coaster 11 is capable of collecting any condensate that collect son the exterior surface of the beverage container 60 and trickles down via gravity. When the gate assembly 30a, 30b, 30c, 30d is selectively manipulated, both the coaster aperture 40 and the gate aperture 45 are aligned with the slot 27 in order to enable any condensate from the exterior of the beverage container 60 (or already collected in the interior 15 of the coaster 11) to flow directly onto the plant 64 and dirt 63 within the pot 65. In certain other embodiments, the bottom wall interior 20a can be gently sloped in all directions from the inner surface of the first sidewall 13 to the coaster aperture 40 in order to better direct flow of condensate.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed:

1. A beverage container stand coaster, comprising:
   a coaster supported on a stand, the coaster and the stand are formed together, the coaster is an open cylindrical body with an interior, a cylindrical first sidewall, a planar bottom wall, and a gate assembly slidably retained to a bottom wall interior;
   a ledge located on an interior side of the first sidewall, the ledge extends inwards continuously about its diameter, therefrom;
   a stand vertical portion having a first end and a second end;
   a stand base comprising a stand base first side and a stand base second side continuous and horizontally disposed relative to the stand vertical portion, the stand base first side and the stand base second side are configured to rest upon a horizontal surface;

the first end of the stand vertical portion bisects a transition point between the stand base first side and the stand base second side and is vertically positioned relative thereto;

a post horizontal portion extending horizontally ninety degrees away from the front directly from the second end of the stand vertical portion;

a perimeter of a second sidewall depended downwards from a perimeter of a bottom wall exterior at a distance that equals a pair of slots located at diametrically opposing sides of the second sidewall;

the gate assembly slidably retained within each slot, the gate assembly includes a gate first segment located on a first side of each slot that has a width enabling it to be slidably engaged with each slot;

a gate first end disposed at a terminal end of the gate first segment, the gate first end includes a pair of laterally extending ears of a gradually curved nature that restrict full retraction of the gate first segment within the pair of slots;

a gate second segment adjacent the gate first segment that is separated by a pair of opposing gates first notches, the gate second segment fully resides subjacent to the bottom wall;

a gate third segment residing adjacent the gate second segment that is separated by a pair of opposing gates second notches, the gate third segment fully resides subjacent to the bottom wall;

a gate fourth segment residing adjacent to the gate third segment that is separated by a pair of opposing gates third notches, the gate fourth segment fully resides subjacent to the bottom wall;

a gate second end adjacent the gate fourth segment and separated by a pair of opposing gates fourth notches, the gate second end fully resides outside the second sidewall on the other side of the pair of slots, the gate second end comprises of a pair of laterally extending ears of a gently curved nature that restrict full retraction of the gate second end within the slot; and a gate aperture located on the gate third segment, the gate aperture has a diameter sized to be identical with the width of the pair of slots, as well as identical with a diameter of a coaster aperture, when fully aligned, the coaster aperture and the gate aperture enables the interior of the coaster to be in fluid communication with an area below the coaster and in front of and above the stand.

2. The beverage container stand coaster according to claim 1, wherein the beverage container stand coaster supports a beverage container above a plant within a pot.

3. The beverage container stand coaster according to claim 1, wherein the beverage container stand coaster is made out of a resilient material.

4. The beverage container stand coaster according to claim 3, wherein the beverage container stand coaster is made out plastic.

5. The beverage container stand coaster according to claim 1, wherein the coaster and the stand are a unitary construction.

6. The beverage container stand coaster according to claim 1, wherein the coaster and the stand are separate.

7. The beverage container stand coaster according to claim 1, wherein the coaster and the stand are separate features that are permanently conjoined.

8. The beverage container stand coaster according to claim 7, wherein the coaster and the stand are conjoined by a bonding method.

9. The beverage container stand coaster according to claim 8, wherein the bonding method is adhesive.

10. The beverage container stand coaster according to claim 8, wherein the bonding method is welding.

11. The beverage container stand coaster according to claim 1, wherein the stand is tubular and hollow.

12. The beverage container stand coaster according to claim 1, wherein the stand is tubular and solid.

13. The beverage container stand coaster according to claim 1, wherein the coaster is attached to the end of the stand horizontal portion opposite the post vertical portion.

14. The beverage container stand coaster according to claim 1, wherein the stand is capable of a balanced support of a beverage container that is full and supported within the coaster.

15. The beverage container stand coaster according to claim 1, wherein a thickness of the first sidewall is larger between the ledge and the bottom wall interior than between the ledge and an upper wall.

16. The beverage container stand coaster according to claim 15, further comprising a plurality of different diameters at an inner surface of the first sidewall and enables different diameters of beverage containers to be securely supported within the coaster.

17. The beverage container stand coaster according to claim 1, wherein the stand base first side and the stand base second side each terminate in a rounded shape.

18. The beverage container stand coaster according to claim 1, wherein a width between inner sides of parallel portions of the stand base first side may accommodate a desk-type or small houseplant.

19. The beverage container stand coaster according to claim 1, wherein the pair of gates first notches and the pair of gates fourth notches are configured to engage inner walls of the pair of slots to limit movement of the gate assembly within the pair of slots.

* * * * *